(12) United States Patent
Amano

(10) Patent No.: US 7,819,429 B2
(45) Date of Patent: Oct. 26, 2010

(54) MOUNTING STRUCTURE OF SEATBELT RETRACTOR

(75) Inventor: Atsushi Amano, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 161 days.

(21) Appl. No.: 12/190,087

(22) Filed: Aug. 12, 2008

(65) Prior Publication Data

US 2009/0051155 A1 Feb. 26, 2009

(30) Foreign Application Priority Data

Aug. 24, 2007 (JP) ............................. 2007-218895

(51) Int. Cl.
*B60R 22/20* (2006.01)
*B60R 22/08* (2006.01)
(52) U.S. Cl. ................ 280/801.1; 280/803; 296/203.04
(58) Field of Classification Search ............. 280/801.1, 280/801.2, 803, 807, 808; 296/37.7, 37.8, 296/203.04, 210, 214; 297/468, 481, 483
See application file for complete search history.

(56) References Cited

U.S. PATENT DOCUMENTS

| | | | | |
|---|---|---|---|---|
| 3,534,979 A | * | 10/1970 | Barecki et al. | 280/805 |
| 3,542,425 A | * | 11/1970 | Pringle | 297/474 |
| 3,819,197 A | * | 6/1974 | Shakespear | 297/478 |
| 6,234,529 B1 | * | 5/2001 | Ellison et al. | 280/808 |
| 6,302,442 B1 | | 10/2001 | Shimozawa | |
| 6,334,628 B1 | * | 1/2002 | Newball et al. | 280/801.1 |
| 6,854,766 B2 | * | 2/2005 | Kobayashi | 280/801.1 |
| 6,880,857 B2 | * | 4/2005 | Schwarz et al. | 280/801.1 |
| 6,971,677 B2 | * | 12/2005 | Niimi | 280/801.1 |
| 7,328,918 B2 | * | 2/2008 | Hirotani | 280/803 |
| 7,377,550 B2 | * | 5/2008 | Lee | 280/803 |
| 2005/0017497 A1 | * | 1/2005 | Hirotani | 280/807 |
| 2006/0001253 A1 | * | 1/2006 | Lee | 280/807 |
| 2008/0111417 A1 | | 5/2008 | Ohta | |

FOREIGN PATENT DOCUMENTS

| | | |
|---|---|---|
| DE | 102005029181 A1 | 1/2006 |
| JP | 2000-1156 | 1/2000 |
| JP | 3716400 | 9/2005 |

OTHER PUBLICATIONS

Office Action issued by German Patent and Trademark Office on May 19, 2009.
English language Abstract of JP 2000-1156, Jan. 7, 2000.

* cited by examiner

*Primary Examiner*—Paul N Dickson
*Assistant Examiner*—Joseph Rocca
(74) *Attorney, Agent, or Firm*—Stein McEwen, LLP

(57) ABSTRACT

A mounting structure of a seatbelt retractor is provided. In the mounting structure, the seatbelt retractor for winding up a seatbelt is mounted one end of a roof end member on the lateral side of a vehicle, on which a hinge reinforcement for reinforcing a hinge mounting portion for a backdoor is superimposed. The hinge reinforcement and the one end of the roof end member are formed with an opening. The seatbelt retractor is accommodated in the opening. The seatbelt retractor has a pair of mounting portions. The mounting portions of the seatbelt retractor are fastened on both sides of the opening by first fastening members, respectively, such that the seatbelt retractor is fixed to the roof end member and the hinge reinforcement.

3 Claims, 7 Drawing Sheets

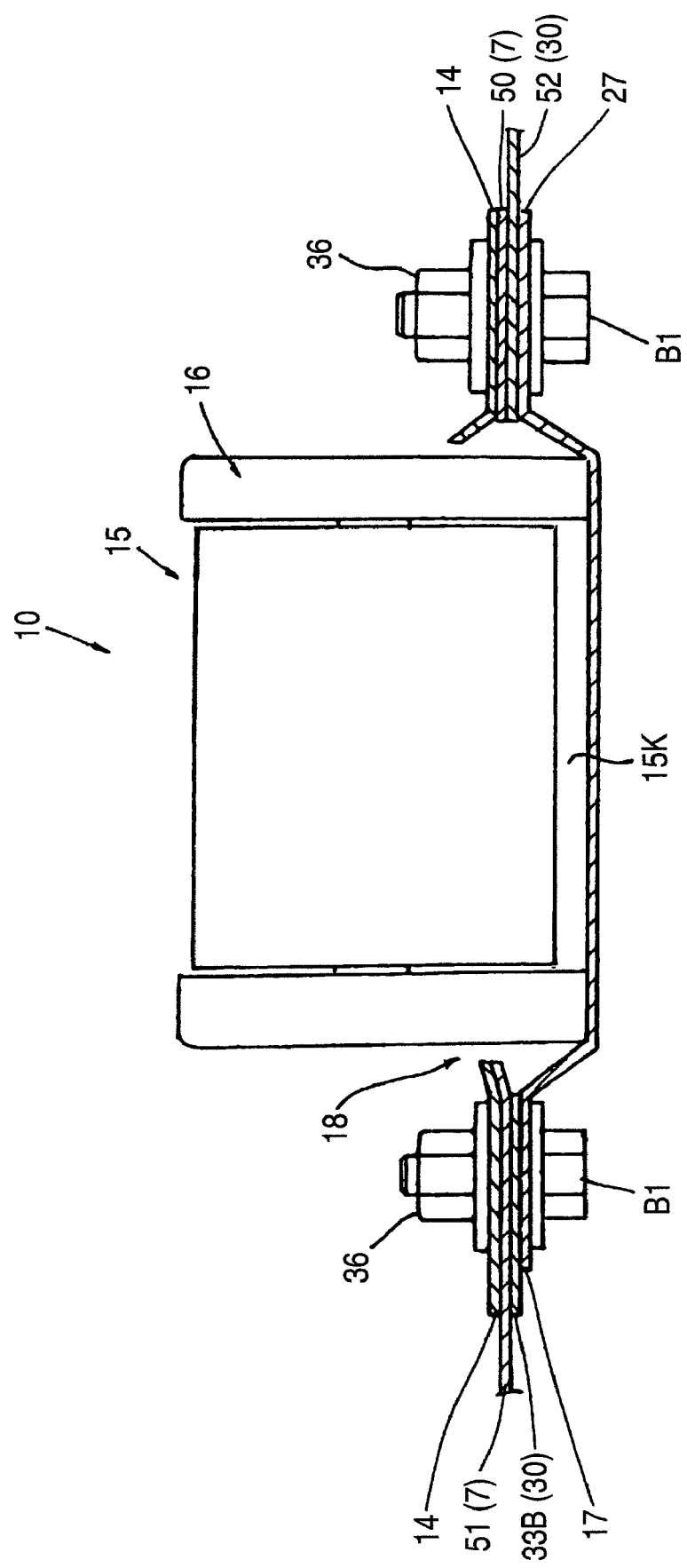

MOUNTING STRUCTURE OF SEATBELT RETRACTOR

This application claims priority from Japanese Patent Application No. 2007-218895 filed Aug. 24, 2007, the entire contents of which are herein incorporated by reference.

BACKGROUND

The present invention relates to a mounting structure of a seatbelt retractor, in which the seatbelt retractor for winding up a seatbelt is mounted on one end of a roof end member, on which a hinge reinforcement for reinforcing a hinge mounting portion for a backdoor is superimposed, on the lateral side of a vehicle.

As for seatbelt devices of vehicles, there are provided a two-point seatbelt device and a three-point seatbelt device. Recently, three-point seatbelt device is usually adopted. The three-point seatbelt device requires a seatbelt retractor which winds up a seatbelt for fixing the upper body of a passenger when the seatbelt is not used.

In a case of a rear seat for three persons, seatbelt retractors for both left and right seats can be fixed to left and right rear pillars, respectively. However, a central seat is separated from the rear pillars. When a seatbelt retractor for the central seat is mounted on the left or right rear pillar, there are difficulties in the layout of a seatbelt. Therefore, there is proposed a unit which fixes a seatbelt retractor to a shoulder portion of a rear seat and houses the seatbelt retractor. According to this unit, however, since the shoulder portion of the rear seat is raised, the appearance thereof is degraded, and seat arrangement is limited.

To solve such a problem, Patent Document 1 discloses a structure in which a mounting bracket of a seatbelt retractor is obliquely provided on one end of a roof end member on one side of a vehicle and an end (rear end) of a roof side rail on the rear side of the vehicle. On the one end of the roof end member, a hinge reinforcement is superimposed, which reinforces a hinge mounting portion for a backdoor.

In this structure, a winding portion of a seatbelt retractor is disposed in a space of the mounting bracket on the front side of the vehicle, that is, a space of a corner portion on the front side of the vehicle, which is defined by the one end of the roof end member and the end (rear end) of the roof side rail. The winding portion is cantilever-supported by the roof end member and the roof side rail through the mounting bracket.

Patent Document 1: Japanese Patent No. 3716400

According to the above-described structure, since the winding portion of the seatbelt retractor is cantilever-supported by the roof end member and so on through the mounting bracket, the supporting of the seatbelt retractor is unstable. When the winding portion of the seatbelt retractor is placed on the central portion of the mounting bracket so as to be mounted and fixed, the winding portion can be stably supported. In this structure, however, a portion of the mounting bracket between both mounting portions thereof (a mounting bracket portion on which the mounting portion is placed) should be bulged further downward so as to secure a housing space for the winding portion. Therefore, since the ceiling of the vehicle is bulged downward, the appearance of the ceiling is degraded.

SUMMARY

It is therefore an object of the invention to provide a mounting structure of a seatbelt retractor, which has a structure that can prevent the appearance of the ceiling of a vehicle from being degraded and can stably support the seatbelt retractor. Further, the mounting structure can prevent a reduction in rigidity of a vehicle body caused by the mounting of the seatbelt retractor such that the rigidity of the vehicle body can be secured.

According to an aspect of an exemplary embodiment of the present invention, there is provided a mounting structure of a seatbelt retractor, in which the seatbelt retractor for winding up a seatbelt is mounted one end of a roof end member on the lateral side of a vehicle, on which a hinge reinforcement for reinforcing a hinge mounting portion for a backdoor is superimposed, wherein the hinge reinforcement and the one end of the roof end member are formed with an opening; wherein the seatbelt retractor is accommodated in the opening; wherein the seatbelt retractor has a pair of mounting portions; and wherein the mounting portions of the seatbelt retractor are fastened on both sides of the opening by first fastening members, respectively, such that the seatbelt retractor is fixed to the roof end member and the hinge reinforcement.

In this construction, the seatbelt retractor can be disposed in the opening formed in the hinge reinforcement and the one end of the roof end member on which the hinge reinforcement is superimposed, and the seatbelt retractor can be accommodated in the roof end member through the opening. Accordingly, the seatbelt retractor does not project downward from the roof end member, and a ceiling portion under the seatbelt retractor does not need to be bulged downward, which makes it possible to prevent the appearance of the ceiling of the vehicle from being degraded.

Further, since the pair of mounting portions of the seatbelt retractor are fastened and fixed to the roof end member and the hinge reinforcement on both sides of the opening by the first fastening members, the mounting strength of the mounting portion can be increased. The hinge reinforcement is a member which reinforces the hinge mounting portion for the backdoor such that sufficient strength is provided. Therefore, by fastening and fixing the mounting portion to the hinge reinforcement as described above, it is possible to further increase the mounting strength. Further, since the seatbelt retractor housed in the opening can be supported by the roof end member and the hinge reinforcement through the pair of mounting portions from both sides of the opening, the seatbelt retractor can be stably supported. The roof end member has the opening formed therein, but the pair of mounting portions are mounted and fixed on both sides of the opening as described above. Therefore, since the opening can be reinforced by the seatbelt retractor which is fixed to the side periphery of the opening so as to be installed in the opening, the rigidity of the vehicle body can be secured. Accordingly, it is possible to increase the strength of the mounting structure of the seatbelt retractor.

The hinge reinforcement may be disposed such that the hinge reinforcement is located above the roof end member and the seatbelt retractor is surrounded by the opening; a pedestal-shaped raised portion may be formed by raising a first hinge reinforcement portion upward from the side of the roof end member, the first hinge reinforcement portion being positioned closer to the rear side of the opening of the hinge reinforcement; an upper surface of the raised portion may be superimposed, from the lower side, on the hinge mounting portion provided in a roof panel which is located above the hinge reinforcement; the hinge may have a mounting portion; and the mounting portion of the hinge, the hinge mounting portion and the raised portion may be fastened by a second fastening member such that the hinge is fixed to the roof panel and the hinge reinforcement.

In this construction, the hinge reinforcement can be disposed in such a manner that the hinge reinforcement is positioned above the roof end member and the opening of the hinge reinforcement surrounds the seatbelt retractor. Therefore, the mounting portions and the winding portion of the seatbelt retractor are not significantly separated from each other in a vertical direction. That is, the mounting portions and the winding portion of the seatbelt retractor can be set adjacent to each other in the vertical direction. Therefore, it is possible to minimize the falling of the seatbelt retractor caused by a force applied from a passenger in a direction where the seatbelt is drawn out. Accordingly, the winding portion can be stably supported by the roof end member and the hinge reinforcement through the mounting portions.

Further, the first hinge reinforcement portion of the hinge reinforcement closer to the rear side of the vehicle than the opening is raised upward from the side of the roof end member so as to form the pedestal-shaped raised portion, and the upper surface of the raised portion is superimposed on the hinge mounting portion provided in the roof panel above the hinge reinforcement from the lower side such that the mounting portion at the hinge for the backdoor is fastened and fixed to the hinge mounting portion and the upper surface of the raised portion by the second fastening member. Therefore, the hinge reinforcement has a space structure which is strong against an external force such that the rigidity thereof can be increased. Further, a pulling force applied to the seatbelt retractor can be transmitted to the roof panel, and the pulling force can be easily supported by the roof panel. Therefore, the strength of the mounting structure of the seatbelt retractor can be increased.

A roof panel portion closer to the rear side of the vehicle than the hinge mounting portion may be curved downward and may be superimposed on a wall portion of the raised portion on the rear side of the vehicle so as to be welded and fixed. Therefore, the rigidity of the hinge reinforcement can be further increased. Further, a pulling force from the seatbelt retractor can be reliably transmitted to the roof panel and can be easily supported by the roof panel. Therefore, the strength of the mounting structure of the seatbelt retractor can be increased.

A quarter inner extension may be superimposed on the upper end of a rear pillar, an end of a roof side rail on the rear side of the vehicle, and a first roof end member portion positioned closer to the outside in a vehicle width direction than the opening at the one end of the roof end member, which are coupled with one another by the quarter inner extension. The rear end portion of the quarter inner extension superimposed on the first roof end member portion may extend to the inside in the vehicle width direction such that the extension portion is disposed on the rear side of the opening and is welded and fixed to the one end of the roof end member and the hinge reinforcement. The lower side of the raised portion may be closed by the extension portion such that the extension portion and the raised portion form a closed cross section.

In this construction, a force applied from the seatbelt retractor by pulling the seatbelt can be transmitted to the rear pillar or the roof side rail through the quarter inner extension. That is, the rear pillar effectively acts against a downward force applied from the seatbelt retractor so as to sufficiently resist the downward force, and the roof side rail acts effectively against a force applied from the seatbelt retractor in the forward direction so as to sufficiently resist the force. As such, the force applied from the seatbelt retractor can be also supported by the rear pillar or the roof side rail. Further, the lower side of the raised portion is blocked by the extension portion, and the closed section is constructed by the extension portion and the raised portion. Therefore, the rigidity of the hinge reinforcement can be increased. Accordingly, the strength of the mounting structure of the seatbelt retractor can be further increased.

A second extension portion may be provided, which extends from an extension end of the extension portion toward the front side of the vehicle so as to be superimposed on a second roof end member portion closer to the inside in the vehicle width direction than the opening; one of the mounting portions of the seatbelt retractor may be fastened and fixed to the second extension portion, the second roof end member portion, and the hinge reinforcement by one of the first fastening members; and another of the mounting portions of the seatbelt retractor may be fastened and fixed to the quarter inner extension portion, the first roof end member portion, and the hinge reinforcement by another of the first fastening members.

One mounting portion of the seatbelt retractor is fastened and fixed to the second extension portion, the second roof end member portion, and the hinge reinforcement through the first fastening member, and the other mounting portion of the seatbelt retractor is fastened and fixed to the quarter inner extension portion, the first roof end member portion, and the hinge reinforcement by the first fastening member. Therefore, the mounting strength of the mounting portion of the seatbelt retractor can be further increased, and the effect according to the fourth aspect can be easily obtained. Further, it is possible to further increase the strength of the rear portion of the opening where a pulling force from the seatbelt retractor strongly acts.

According to the present invention, it is possible to provide a mounting structure of a seatbelt retractor, which can prevent the appearance of the ceiling of the vehicle from being degraded and can stably support the seatbelt retractor.

BRIEF DESCRIPTION OF THE DRAWINGS

The above and other aspects of the present invention will become more apparent by describing in detail exemplary embodiments thereof with reference to the accompanying drawings, wherein:

FIG. 7 is a cross-sectional view taken along A-A line of FIG. 4, showing the mounting structure of the seatbelt retractor.

DETAILED DESCRIPTION OF EXEMPLARY EMBODIMENTS

Hereinafter, an embodiment of the present invention will be described with reference to the accompanying drawings.

Figure 1:
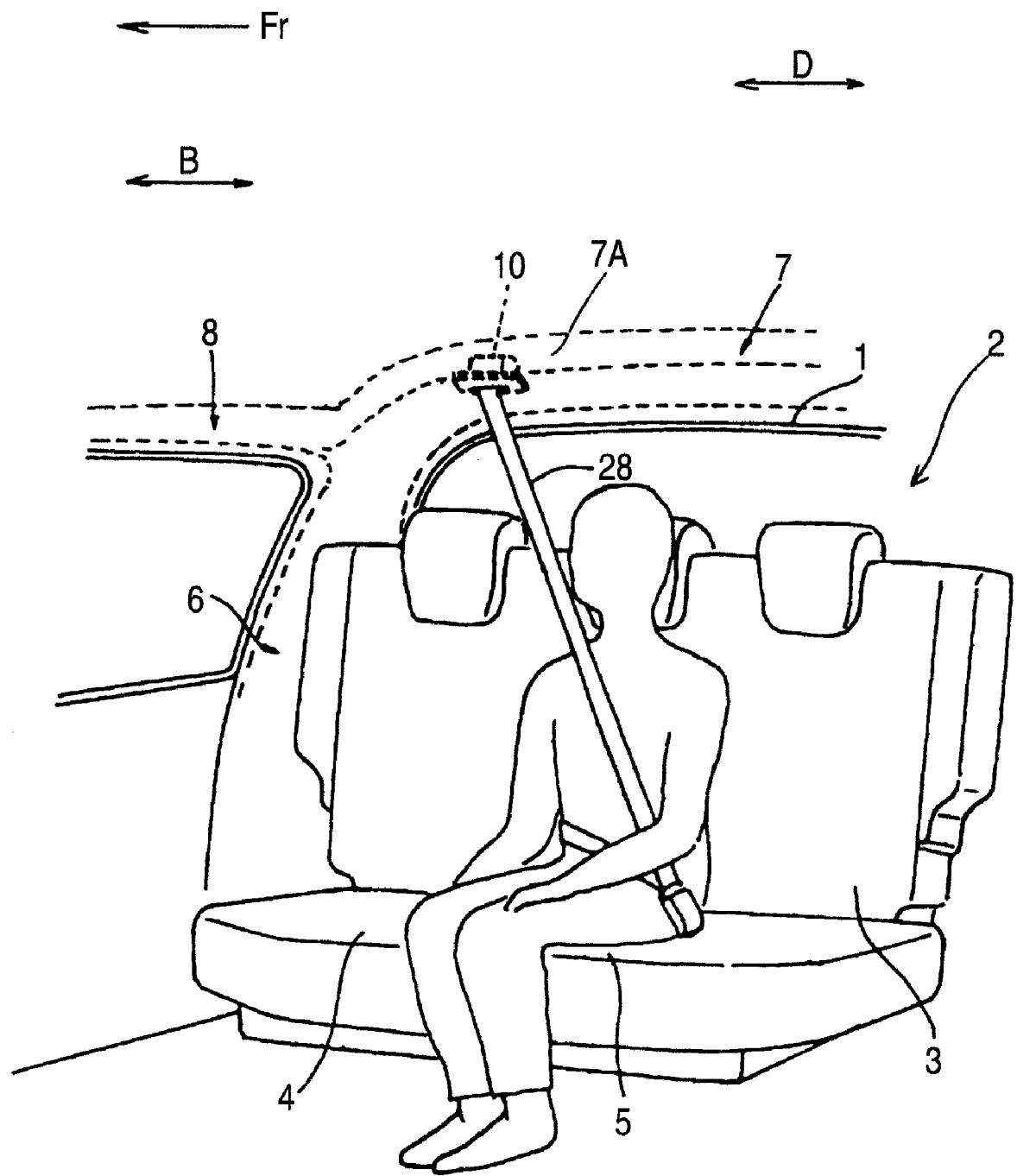
FIG. 1 is a diagram showing the structure of a rear seat for three persons and the surrounding thereof as seen from the left oblique front side.

FIG. 1 is a diagram showing the structure of a rear seat 2 of a wagon (corresponding to a vehicle) provided with a backdoor 1 and the surrounding of the rear seat 2 as seen from the left oblique front side. The rear seat 2 for three persons is composed of a left seat 3, a right seat 4, and a central seat 5. Each of the seats 3, 4, and 5 is provided with a three-point seatbelt device. The seatbelt device includes a seatbelt retractor 10 which winds up a seatbelt 28. Further, the seatbelt retractors 10 of the left and right seats 3 and 4 are mounted on left and right rear pillars 6, respectively, and the seatbelt retractor 10 of the central seat 5 is mounted on one end 7A of a roof end member 7 on the right side of the vehicle along the vehicular width direction D (one end 7A closer to the outside in the vehicular width direction).

An end of a roof side rail 8 on the rear side of the vehicle along the front and rear direction B of the vehicle (hereinafter, referred to as 'rear end') and the one end 7A of the roof end member 7 are welded and fixed to the upper end of the rear pillar 6. A roof panel 9 is mounted on the pair of right and left roof side rails 8 and roof end members 7 (refer to FIG. 6), and the roof side rails 8 and the roof end members 7 are covered by a roof lining 11 from the inside of the vehicle. A pair of left and right hinge mounting portions 13 (hinge mounting portions for the backdoor), which mount hinges 12 for the backdoor 1, are provided on the rear end of the roof panel 9. The backdoor 1 is supported so as to be opened and closed swingably around a horizontal shaft core O in the rear end of the roof panel 9 through the hinge 12 mounted on the hinge mounting portion 13.

Figure 2:
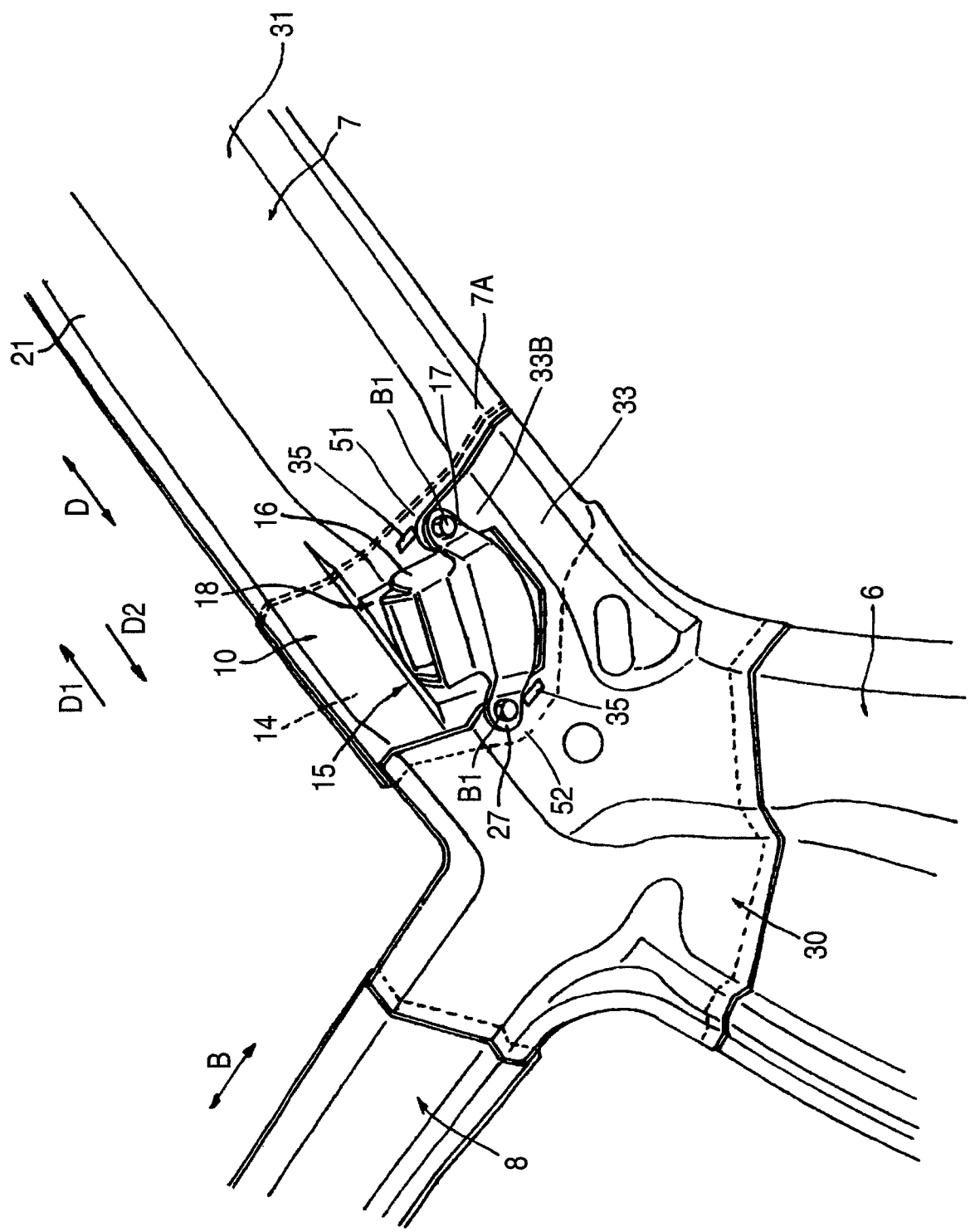
FIG. 2 is a perspective view of a mounting structure of a seatbelt retractor as seen from the front lower side.
Figure 3:
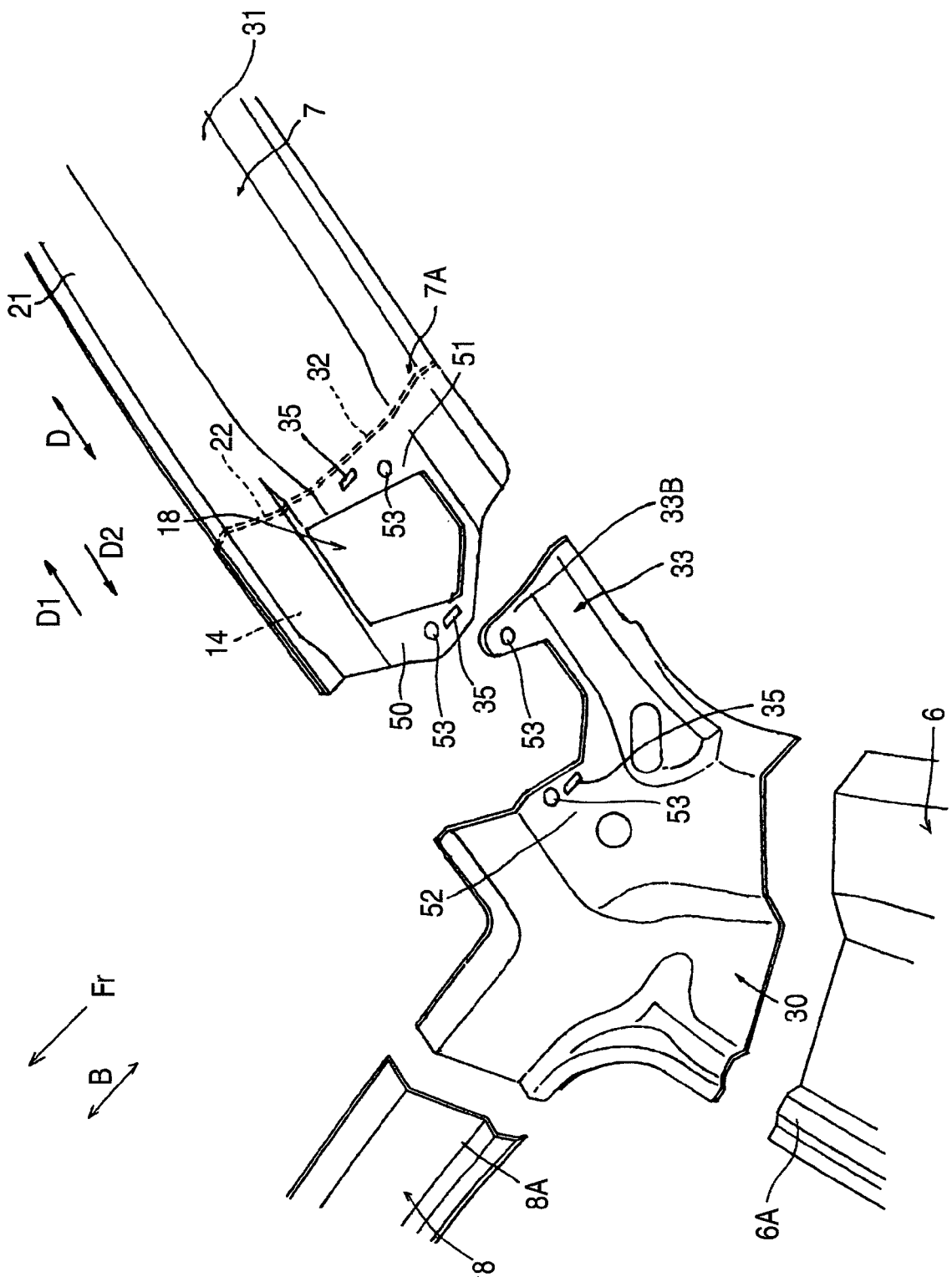
FIG. 3 is an exploded perspective view of a rear pillar, a roof side rail, a roof end member, and a quarter inner extension which includes the rear pillar, the roof side rail, and the roof end member.

As shown in FIGS. 2 and 3, the rear pillar 6 and the roof side rail 8 are formed in a concave and convex shape having a square cross-section such that the rigidity thereof increases.

As shown in FIGS. 2 to 6, the roof end member 7 includes a first vertical wall 21 disposed in a front-up inclined posture and a first bottom wall 31 that is disposed in a front-down inclined position and extends to the rear oblique lower side from the lower end of the first vertical wall 21 at a gentle angle. Accordingly, the rigidity of the roof end member 7 is secured. Further, the lower end of the first vertical wall 21 at the one end 7A of the roof end member 7 is bulged toward the rear side of the vehicle so as to construct a first step portion 41 (refer to FIG. 6), and the vertical wall portion of the first step portion 41 is set in a rear-down inclined posture. Further, a plate-shaped hinge reinforcement 14 which reinforces the hinge mounting portion 13 is disposed above the root end member 7, and is superimposed on the one end 7A of the roof end member 7 from the upper side.

Figure 5:
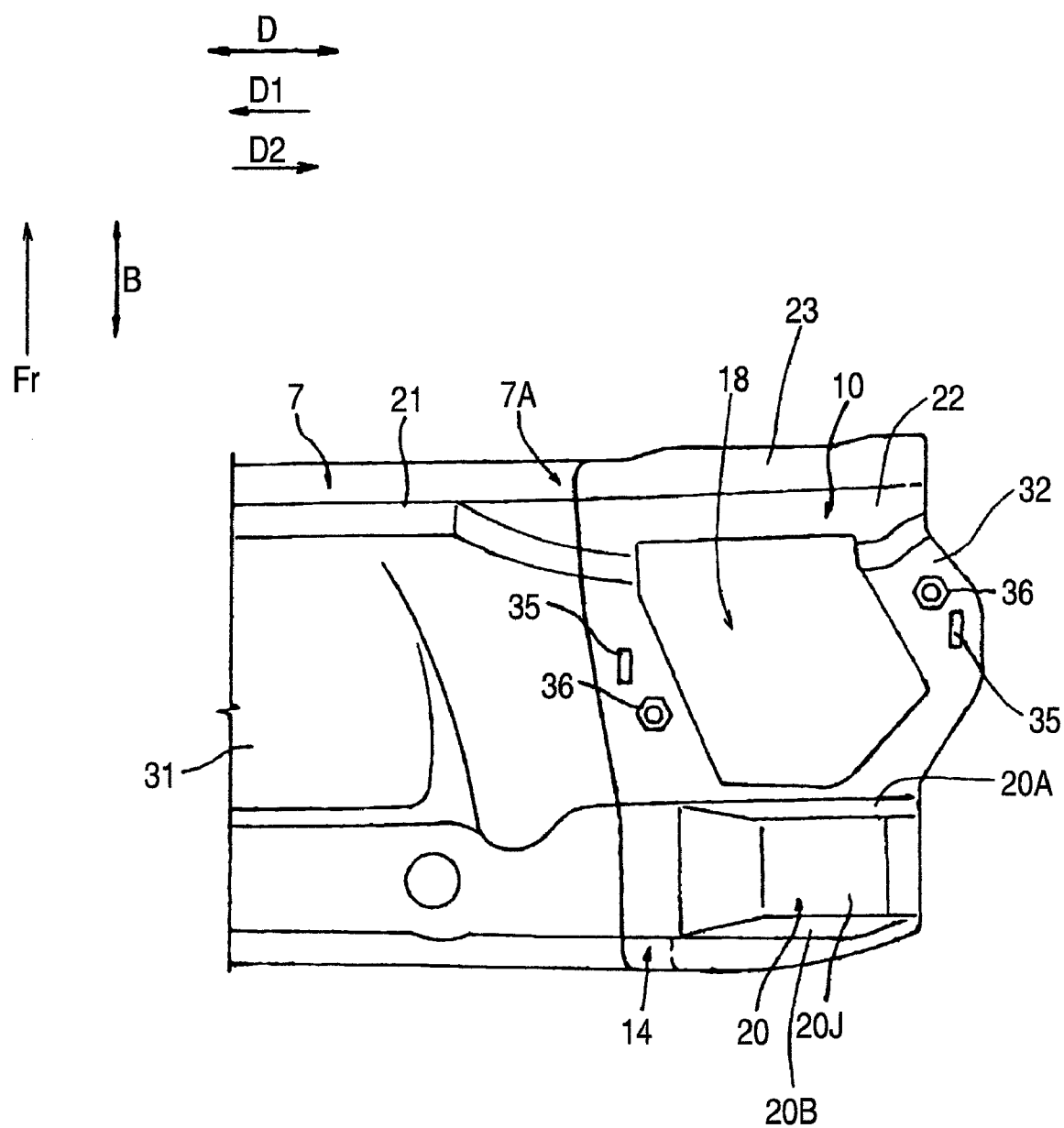
FIG. 5 is a plan view of the roof end member and a hinge reinforcement mounted on the roof end member from the upper side as seen from the top.

Similar to the roof end member 7, the hinge reinforcement 14 includes a second vertical wall 22 disposed in a front-up inclined posture and a second bottom wall 32 disposed in a rear-down inclined posture, the second bottom wall 32 extending to the rear oblique lower side from the lower end of the second vertical wall 22 at a gentle angle (refer to FIGS. 3 and 5). The lower end of the second vertical wall 22 is bulged toward the rear side of the vehicle to construct a second step portion 42 (refer to FIG. 6), and the vertical wall portion of the second step portion 42 is set in a rear-down inclined posture. Further, the upper end of the first vertical wall 21 of the roof end member 7 and the upper end of the second vertical wall 22 of the hinge reinforcement 14 superimposed on the upper end of the first vertical wall 21 from the upper side are curved to the front side Fr of the vehicle. The curved portion 23 is fixed to the lower surface of the roof panel 9.

Further, as will be described below, the roof end member 7 and the hinge reinforcement 14 are fixed to the lower surface of the roof panel 9 on the rear side of the vehicle and have such a cross-sectional structure that is closed along the left and right direction of the vehicle.

Next, a mounting structure of the seatbelt retractor 10 for the central seat 5 will be descried.

Figure 4:
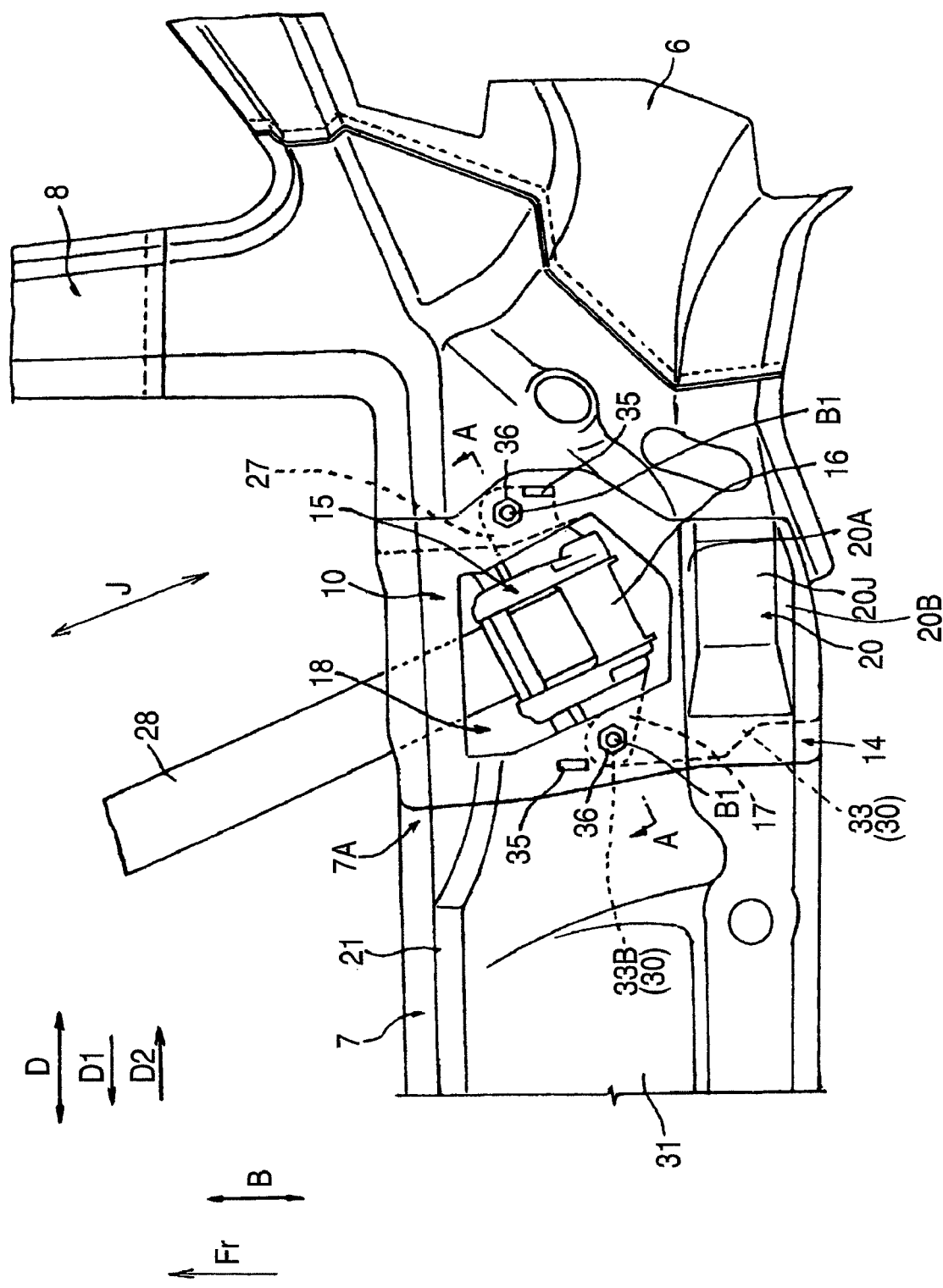
FIG. 4 is a plan view of the mounting structure of the seatbelt retractor as seen from the top.

As shown in FIGS. 2, 4, and 7, the seatbelt retractor 10 includes a seatbelt winding portion 15, a support portion 16 which supports a winding shaft of the winding portion 15 so as to rotate around a horizontal shaft core, and a pair of plate-shaped mounting portions 17 and 27 which overhang from the lower end of the support portion 16 to both the left and right sides. The pair of left and right mounting portions 17 and 27 are positioned to interpose the winding portion 15 and are disposed in parallel to a direction crossing the winding/unwinding direction J of the seat belt 28.

Further, an opening 18 for housing the seatbelt retractor 10 is formed in the hinge reinforcement 14 and the one end 7A of the roof end member 7 on which the hinge reinforcement 14 is superimposed. The opening 18 is formed in the first and second bottom walls 31 and 32 of the roof end member 7 and the hinge reinforcement 14, which are overlapped with each other, and the first and second step portions 41 and 42 which are overlapped with each other. The opening 18 is formed in a rectangular shape, as seen from the vertical direction, and is positioned at substantially the same position at that of the hinge mounting portion 13 of the roof panel 9 in the vehicular width direction D (refer to FIG. 6). Accordingly, the seatbelt 28 can be smoothly drawn out.

Figure 6:
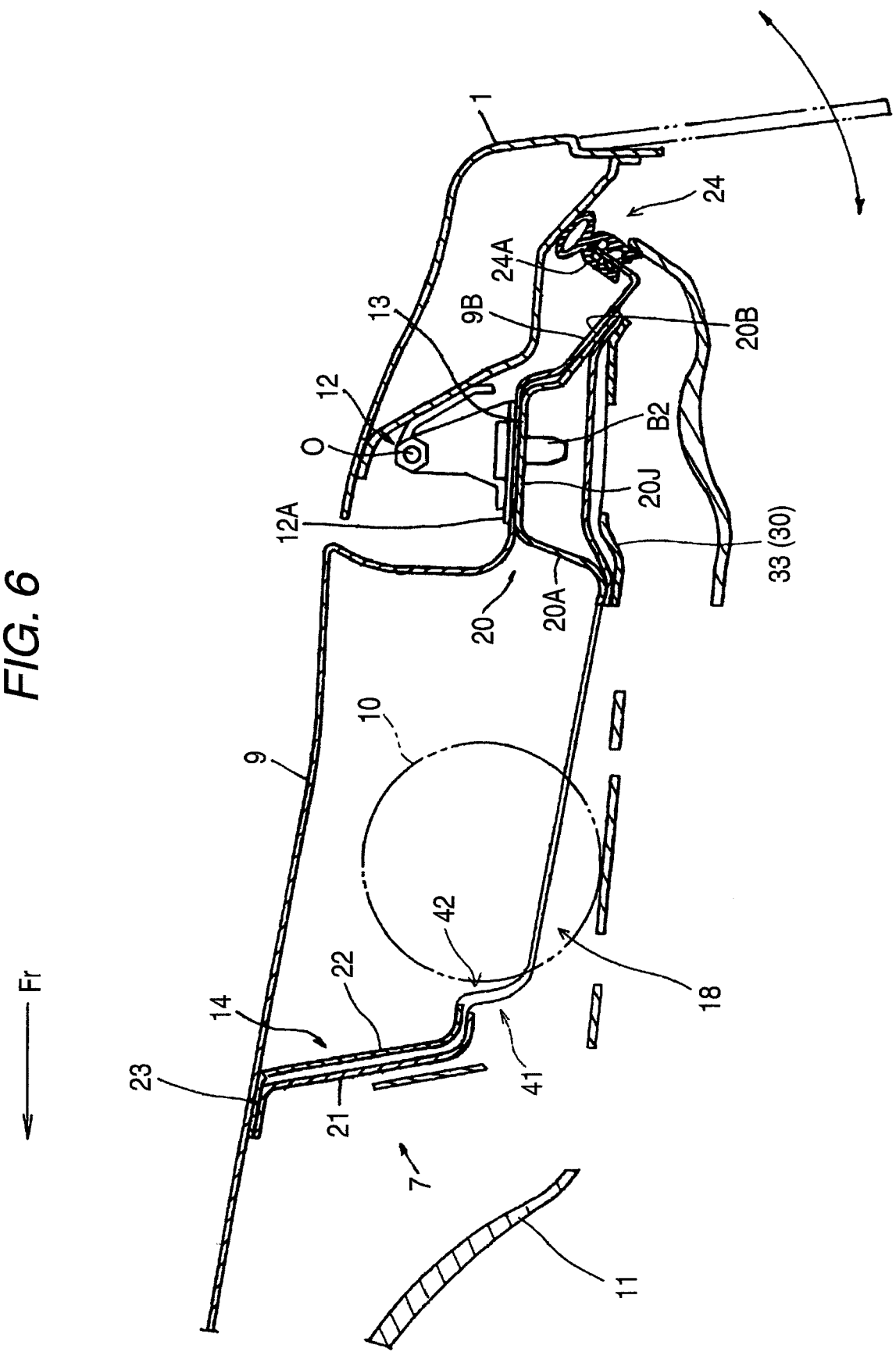
FIG. 6 is a cross-sectional side view of the mounting structure of the seatbelt retractor.

Further, a raised portion 20 is formed by raising a first hinge reinforcement portion closer to the rear side of the vehicle than the opening 18 of the hinge reinforcement 14 upward from the side of the roof end member 7, the raised portion 20 being formed in a pedestal shape as seen from the side (refer to FIGS. 4, 5, and 6). The upper surface 20J of the raised portion 20 is positioned at substantially the same position as those of the upper surfaces of the first send second step portions 41 and 42 in the vertical direction.

As shown in FIG. 6, the roof panel 9 is curved downward on the upper side of a front wall 20A of the raised portion 20 so as to extend downward and is curved toward the rear side of the vehicle in the vicinities of the upper end of the front wall 20A so as to extend toward the rear side of the vehicle. The roof panel portion which extends toward the rear side of the vehicle is constructed in the hinge mounting portion 13.

The upper surface 20J of the raised portion 20 is superimposed on the hinge mounting portion 13 from the lower side, and a mounting portion 12A at the hinge 12 for the backdoor 1 is superimposed on the hinge mounting portion 13 from the upper side such that three members of the mounting portion 12A at the hinge 12, the hinge mounting portion 13, and the upper surface 20J of the raised portion 20 are fastened and fixed through a second mounting bolt B2 (corresponding to a second fastening member). The three members respectively have a bolt insertion hole into which the second mounting bolt B2 is inserted. Further, a roof panel portion 9B closer to the rear side of the vehicle than the hinge mounting portion 13 is bent downward and is superimposed on a rear wall 20B (a wall portion on the rear side of the vehicle) of the raised portion 20 so as to be welded and fixed. The rear end of the root panel portion 9B is raised in an oblique upward direction, and a mounting base portion 24A of a weather strip 24 is fitted into the rear end. The weather strip 24 is formed of an elastic member such as rubber and is compressed by the backdoor 1 so as to seal the space between the roof panel 9 and the backdoor 1.

As shown in FIG. 3, a plate-shaped quarter inner extension 30, which couples the upper end 6A of the rear pillar 6, the rear end 8A (an end on the rear side of the vehicle) of the roof side rail 8, and a first roof end member portion 50 (refer to FIG. 3) disposed closer to the outside in the vehicular width direction (the opposite side to the left and right center of the vehicle, that is, lateral side of the vehicle) than the opening 18 at the one end 7A of the roof end member 7, is superimposed on the upper end 6A, the rear end 8A, and the first roof member portion 50 from the inside of the vehicle so as to be welded and fixed (refer to FIG. 2). The quarter inner extension 30 has the same vertical cross-section as those of the upper end 6A, the rear end 8A, and the first roof member portion 50. Further, the rear end of a quarter inner extension portion 52 superimposed on the first roof end member portion 50 extends toward inside D1 in a vehicular width direction, and an extension portion 33 is disposed at the opening 18 on the rear side of the vehicle. Further, the extension portion 33 is welded and fixed to the one end 7A of the roof end member 7 and the hinge reinforcement 14. As shown in FIGS. 2 and 6, the lower side of the raised portion 20 is blocked by the extension portion 33 such that a closed section is constructed by the extension portion 33 and the raised portion 20.

Further, a second extension portion 33B is provided, which extends from the extension end of the extension portion 33 toward the front side Fr of the vehicle so as to be superimposed on a second roof end member portion 51 (refer to FIG. 3) closer to the inside D1 in the vehicular width direction than the opening 18. As shown in FIGS. 2 and 7, one mounting portion 17 of the seatbelt retractor 10 is superimposed on the second extension portion 33B from the lower side so that one mounting portion 17 may be fastened and fixed to the second extension portion 33B, the second roof end member portion 51, and the hinge reinforcement 14 through the first mounting bolt B1 (corresponding to the first fastening member). Further, the other mounting portion 27 of the seatbelt retractor 10 is superimposed on the quarter inner extension portion 52 closer to outside D2 in the vehicular width direction than the opening 18 so that the other mounting portion 27 may be fastened and fixed to the quarter inner extension portion 52, the first roof end member portion 50, and the hinge reinforcement 14 through another first mounting bolt B1.

As described above, the pair of mounting portions 17 and 27 of the seatbelt retractor 10 are positioned on both sides of the opening 18 in the vehicular width direction, and the seatbelt retractor 10 is supported by the roof end member 7, the hinge reinforcement, and the quarter inner extension 30 through the pair of mounting portions 17 and 27 from both sides of the opening 18. That is, the seatbelt retractor 10 is straddle-supported by the roof end member 7, the hinge reinforcement 14, and the quarter inner extension 30 through the pair of mounting portions 17 and 27.

The four members fastened and fixed through the first mounting bolts B1 have a pair of bolt insertion holes 53 to which the pair of first mounting bolts B1 are respectively inserted (refer to FIG. 3). Further, the four members also have a pair of rectangular engagement holes 35 which temporarily lock a pair of claws (not shown) provided in the pair of mounting portions 17 and 27, respectively. According to this construction, before the pair of mounting portions 17 and 27 of the seatbelt retractor 10 are fastened and fixed through the first mounting bolts B1, the pair of claws can be engaged with the pair of engagement holes 35, respectively, so as to temporarily lock the seatbelt retractor 10 to the roof end member 7. Therefore, it is possible to enhance the mountability of the seatbelt retractor 10. Further, a pair of nuts 36 (refer to FIG. 5) are welded and fixed to the upper surface of the hinge reinforcement 14, and the pair of first mounting bolts B1 are screwed to the pair of nuts 36, respectively, (refer to FIG. 7).

As shown in FIGS. 4, 6, and 7, the opening 18 of the hinge reinforcement 14 surrounds the winding portion 15 of the seatbelt retractor 10 in a state where the seatbelt retractor 10 is mounted on the roof end member 7 and so on. Further, the lower end 15K of the winding portion 15 projects more downward than the pair of mounting portions 17 and 27 from the opening 18. For example, when the entire winding portion 15 is housed in the roof end member 7 such that the lower end of the winding portion 15 does not project downward from the opening 18, the height of the roof end member 7 is so large that the space within the vehicle is narrowed in the vertical direction. In the invention, however, since the lower end 15K of the winding portion 15 projects downward from the opening 18, the roof end member 7 does not need to be lengthened in the vertical direction, and the space within the vehicle can be widened in the vertical direction.

As shown in FIG. 5, in a state where the seatbelt retractor 10 is attached to the roof end member 7 and so on, the pair of mounting portions 17 and 27 of the seatbelt retractor 10 are disposed in parallel to a slightly inclined direction with respect to the width direction D such that the seatbelt 28 is unwound toward the central seat 5 in the front lower direction from the winding portion 15 of the seatbelt retractor 10. That is, the pair of mounting portions 17 and 27 are disposed on both sides of the winding portion 15 of the seatbelt retractor 10 so as to be parallel to the substantially vertical direction with respect to the drawing direction of the seatbelt which is drawn out obliquely toward the center of the vehicle.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A mounting structure of a seatbelt retractor, comprising:
a roof end member;
the seatbelt retractor to wind up a seatbelt, the seatbelt retractor mounted on one end of the roof end member on the lateral side of a vehicle;
a hinge reinforcement to reinforce a hinge mounting portion of a backdoor, the hinge reinforcement superimposed on the roof end member; and
a hinge having a mounting portion of the hinge,
wherein the hinge reinforcement and the one end of the roof end member are formed with an opening,
wherein the seatbelt retractor is accommodated in the opening,
wherein the seatbelt retractor has a pair of mounting portions,
wherein the pair of mounting portions of the seatbelt retractor are fastened on both sides of the opening by first fastening members, respectively, such that the seatbelt retractor is fixed to the roof end member and the hinge reinforcement,
wherein the hinge reinforcement is disposed such that the hinge reinforcement is located above the roof end member and the seatbelt retractor is surrounded by the opening,
wherein a pedestal-shaped raised portion is formed by raising a first hinge reinforcement position upward from a side of the roof end member, the first hinge reinforcement portion being positioned closer to a rear side of the opening of the hinge reinforcement, wherein an upper surface of the raised portion is superimposed, from a lower side, on the hinge mounting portion provided in a roof panel located above the hinge reinforcement, wherein the mounting portion of the hinge, the hinge mounting portion of the backdoor and the raised portion are fastened by a second fastening member such that the hinge is fixed to the roof panel and the hinge reinforcement, wherein a quarter inner extension is superimposed on an upper end of a rear pillar, an end of a roof side rail on the rear side of the vehicle, and a first roof end member portion positioned closer to an outside in a vehicle width direction than the opening at the one end of the roof end member, which are coupled with one another by the quarter inner extension, wherein a rear end portion of the quarter inner extension superimposed on the first roof end member portion extends to the inside in a vehicle width direction such that an extension portion is disposed on the rear side of the opening and is welded and fixed to the one end of the roof end member and the hinge reinforcement, and wherein a lower side of the raised portion is closed by the extension portion such that the extension portion and the raised portion form a closed cross section.

2. The mounting structure as set forth in claim 1, wherein a roof panel portion closer to a rear side of the vehicle than the hinge mounting portion is curved downward and is superimposed on a wall portion of the raised portion on the rear side of the vehicle so as to be welded and fixed.

3. The mounting structure as set forth in claim 1, further comprising:

second extension portion extending from an extension end of the extension portion toward the front side of the vehicle so as to be superimposed on a second roof end member portion closer to the inside in the vehicle width direction than the opening;

wherein one of the pair of mounting portions of the seatbelt retractor is fastened and fixed to the second extension portion, the second roof end member portion, and the hinge reinforcement by one of the first fastening members; and wherein another of the pair of mounting portions of the seatbelt retractor is fastened and fixed to the quarter inner extension portion, the first roof end member portion, and the hinge reinforcement by another of the first fastening members.

\* \* \* \* \*